United States Patent
Koumura et al.

(10) Patent No.: US 7,135,235 B2
(45) Date of Patent: Nov. 14, 2006

(54) OPTICAL FIBER PREFORM AND THE METHOD OF PRODUCING THE SAME

(75) Inventors: Yukio Koumura, Chiyoda-ku (JP); Yasuhiro Naka, Chiyoda-ku (JP); Nobuaki Orita, Chiyoda-ku (JP)

(73) Assignee: The Furukawa Electric Co., Ltd., Tokyo (JP)

(*) Notice: Subject to any disclaimer, the term of this patent is extended or adjusted under 35 U.S.C. 154(b) by 232 days.

(21) Appl. No.: 10/970,379

(22) Filed: Oct. 22, 2004

(65) Prior Publication Data

US 2005/0214543 A1 Sep. 29, 2005

Related U.S. Application Data

(63) Continuation of application No. 10/242,609, filed on Sep. 13, 2002, now Pat. No. 6,827,883.

(30) Foreign Application Priority Data

Sep. 14, 2001 (JP) .............................. 2001-279675

(51) Int. Cl.
*B29B 7/00* (2006.01)

(52) U.S. Cl. .................. 428/542.8; 428/210; 428/213; 428/220

(58) Field of Classification Search ................ 428/213, 428/220, 542.8; 385/128
See application file for complete search history.

(56) References Cited

U.S. PATENT DOCUMENTS

2002/0057879 A1    5/2002   Koumura et al.

*Primary Examiner*—Jennifer C. McNeil
*Assistant Examiner*—G. Blackwell
(74) *Attorney, Agent, or Firm*—Oblon, Spivak, McClelland, Maier & Neustadt, P.C.

(57) ABSTRACT

An optical fiber preform (1) serving as a material of an optical fiber has a shoulder portion (12) thrusting beyond a middle portion (M) in a base end region (K) which is on the upper side when the optical fiber preform is suspended for a drawing process. The optical fiber preform (1) of this configuration can be easily produced by appropriately setting the heating condition, etc. for the sintering step in the production process. Thus, it is possible to omit the elongating step after the sintering step, thereby simplifying the production process. Further, in the prior-art technique, turbulence is generated in the gas flow in the furnace of the drawing apparatus toward the end of the drawing step, making it impossible to draw in a stable manner. In contrast, in this embodiment, due to the shoulder portion (12), there is a small gap between the inner wall surface of the furnace and the optical fiber preform; due to this small gap, the gas flow is regulated, and the drawing can be conducted in a stable manner even toward the end of the drawing step.

4 Claims, 7 Drawing Sheets

OPTICAL FIBER PREFORM AND THE METHOD OF PRODUCING THE SAME

CROSS-REFERENCE TO RELATED APPLICATIONS

This application is a continuation of U.S. patent application Ser. No. 10/242,609, filed Sep. 13, 2002, now U.S. Pat. No. 6,827,883. The entire contents of this application are incorporated herein by reference.

BACKGROUND OF THE INVENTION

An optical fiber preform, which is used as the material of an optical fiber, consists of a core preform constituting the core of an optical fiber and a cladding layer provided in the outer periphery of the core preform and constituting the cladding of the optical fiber. By drawing this optical fiber preform, it is possible to produce an optical fiber.

SUMMARY OF THE INVENTION

According to one aspect of the present invention, there is provided an optical fiber preform comprising:
a core preform constituting a core of an optical fiber; and
a cladding layer formed in the outer periphery of the core preform and constituting a cladding of the optical fiber,
wherein the optical fiber preform is comprised of a large-sized optical fiber preform having outer diameter of 100 mm or more, and
wherein the optical fiber preform has in a base end region, which is on the upper side when it is suspended for a drawing process to produce an optical fiber, a shoulder portion sticking out beyond a middle portion, and has, in a tip end portion on the lower side, a large diameter portion whose outer diameter is larger than that of the middle portion.

Further, according to another aspect of the present invention, there is provided a method for producing an optical fiber preform comprising:
a step of forming, in the outer periphery of a core preform that constitutes a core of an optical fiber, a cladding layer constituting a cladding layer of the optical fiber to thereby prepare a soot body; and
a sintering step to heat the soot body for vitrification,
wherein, in the sintering step, the soot body is suspended and heated sequentially from the lower end toward the upper end thereof, the weight of the lower end portion being utilized when a middle portion of the soot body is being heated to draw the middle portion so that its outer diameter may become smaller than that of the other portions, and
wherein, when heating the upper portion of the soot body, the heating temperature is lowered to thereby leave a non-sintered portion in the upper portion of the soot body.

BRIEF DESCRIPTION OF THE DRAWINGS

Embodiments of the invention will now be described in conjunction with drawings in which.

DETAILED DESCRIPTION OF THE PREFERRED EMBODIMENTS

Figure 6A:
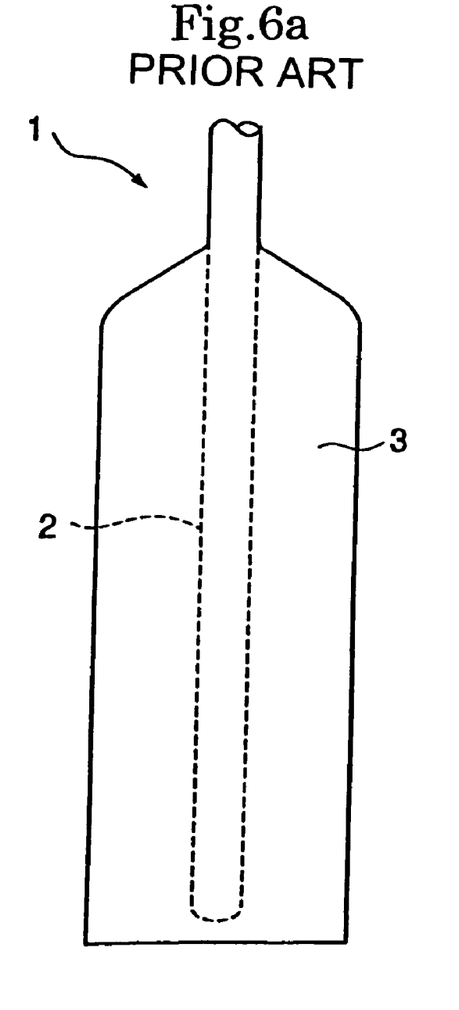
FIG. 6A is a schematic diagram showing a conventional optical fiber preform.
Figure 6B:
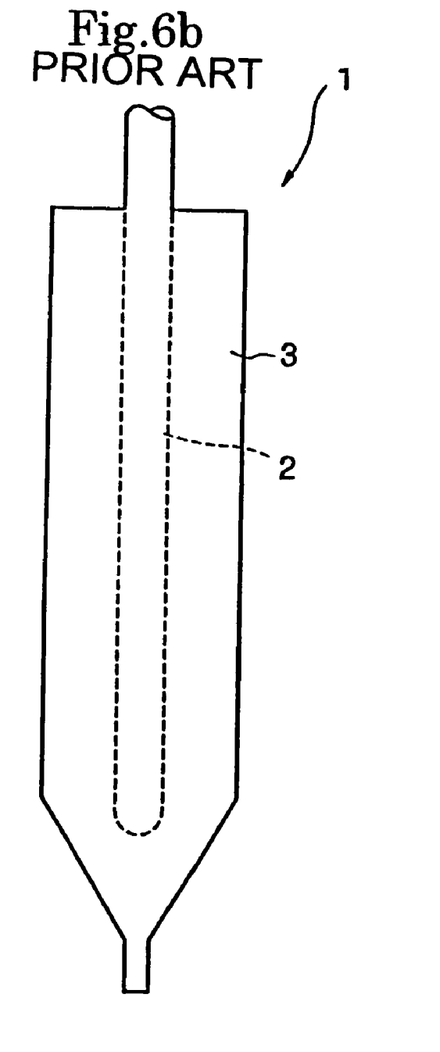
FIG. 6B is a schematic diagram showing another conventional optical fiber preform.
Figure 7:
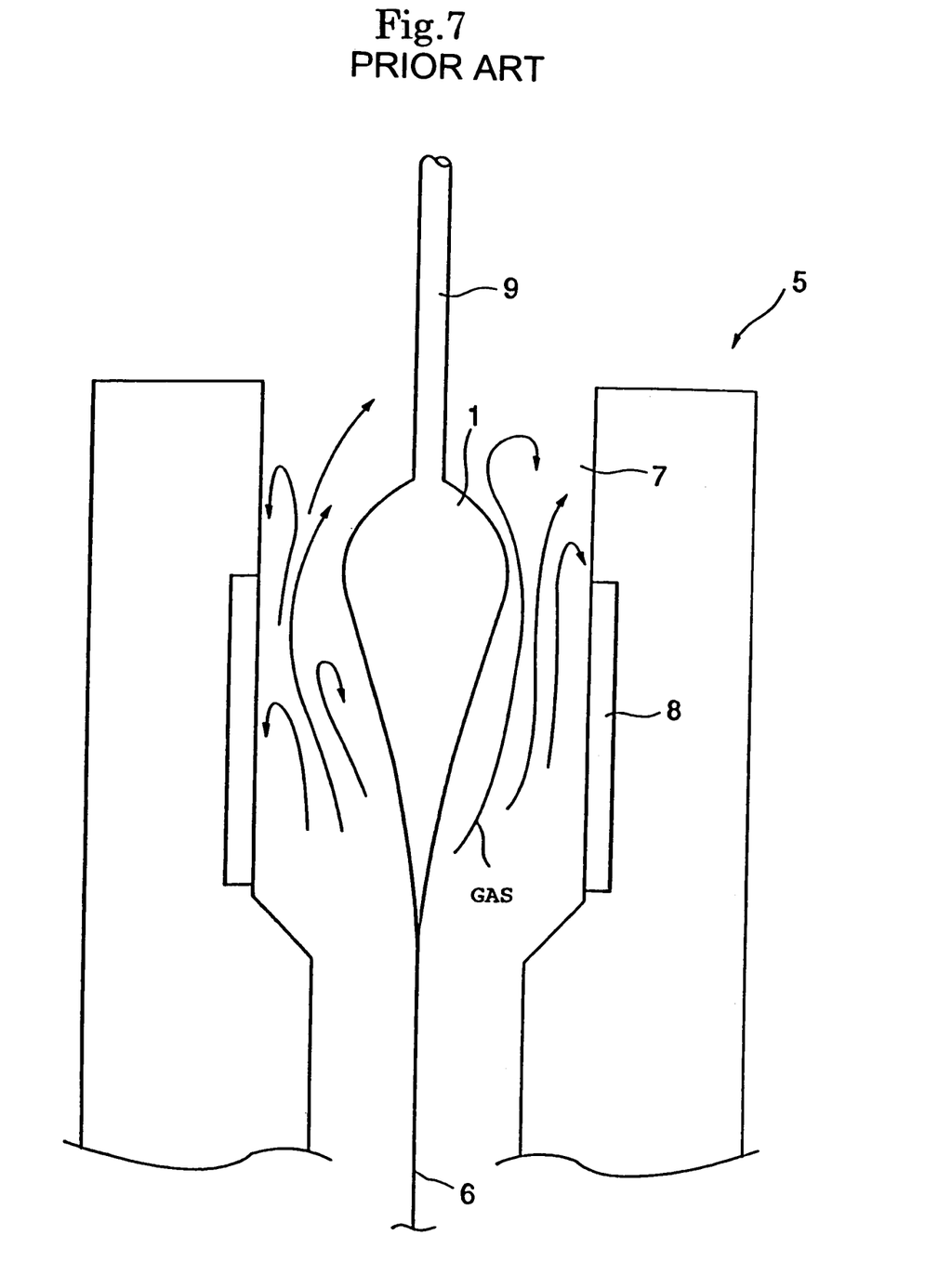
FIG. 7 is a diagram illustrating one of the problems in a conventional optical fiber preform.

FIGS. 6A and 6B schematically show examples of an optical fiber preform serving as the material of an optical fiber. As shown in these drawings, an optical fiber preform 1 consists of a core preform 2 constituting the core of an optical fiber and a cladding layer 3 formed in the outer periphery of the core preform 2 and constituting the cladding of the optical fiber. By performing drawing on this optical fiber preform 1 with a drawing apparatus 5 as shown, for example, in FIG. 7, it is possible to produce an optical fiber 6. In FIG. 7, reference numeral 7 indicates a fusion furnace, reference numeral 8 indicates a heating means (e.g., a heater), and reference numeral 9 indicates a support bar for the optical fiber preform 1.

In the process for producing the optical fiber preform 1, the core preform 2 is first formed by, for example, a VAD (vertical axis deposition) method. Next, this is dehydrated and sintered at high temperature into glass. Then, this vitrified core preform 2 is drawn to unify the outer diameter of the core preform 2.

Thereafter, the cladding layer 3 is formed in the periphery of the core preform by, for example, an OVD (outer vapor deposition) method or a JVD (jacketing vapor deposition) method. What is thus obtained is called a soot body.

Thereafter, the soot body is heated at high temperature and dehydration and removal of impurities are effected with chloride gas or helium gas. As a result, the soot body is sintered into glass. As a result, the optical fiber preform 1 is formed. In order to obtain a high quality optical fiber 6, it is desirable for the outer diameter of the optical fiber preform 1 to be uniform from one end to the other. However, the outer diameter of the optical fiber preform 1 obtained by simply vitrifying the soot body is not uniform. In view of this, a elongating process is widely conducted in which elongation is performed on what is obtained by vitrifying the soot body while heating it to thereby unify the outer diameter of the optical fiber preform 1.

In this way, the optical fiber preform 1 can be produced.

Recently, an attempt has been made to achieve an improvement of productivity and a reduction of production cost for the optical fiber 6 by enlarging the optical fiber preform 1 and increasing the production length of the optical fiber 6 obtained from the optical fiber preform 1. For example, conventionally, it has been possible to produce an optical fiber 6 having a length of approximately 200 to 300 km from a single optical fiber preform. It is to be assumed that by using an enlarged optical fiber preform 1 having an outer diameter of not less than 100 mm, it is possible to produce an optical fiber 6 having a length of, for example, 1000 km or more.

However, an increase in the size of the optical fiber preform 1 involves use of a large-sized elongating apparatus when unifying the outer diameter of the optical fiber preform 1. Further, the quantity of heat imparted to the optical fiber preform 1 at the time of drawing increases, resulting in an increase of energy consumption.

Further, toward the end of the drawing of the optical fiber preform 1, it becomes difficult to produce the optical fiber 6 in a stable manner. In this regard, the region of the optical fiber preform 1 which allows the optical fiber 6 to be produced in a stable manner (the effective drawing region) is rather small, resulting in a wasteful production.

In one aspect of the present invention, there is provided an optical fiber preform which can be easily produced and which allows enlargement of the effective drawing region (the region allowing to draw the optical fiber in a stable manner), and a method of producing such an optical fiber preform.

In the following, an optical fiber preform and a method of producing the same according to an embodiment of the present invention will be described with reference to the drawings.

Figure 1:
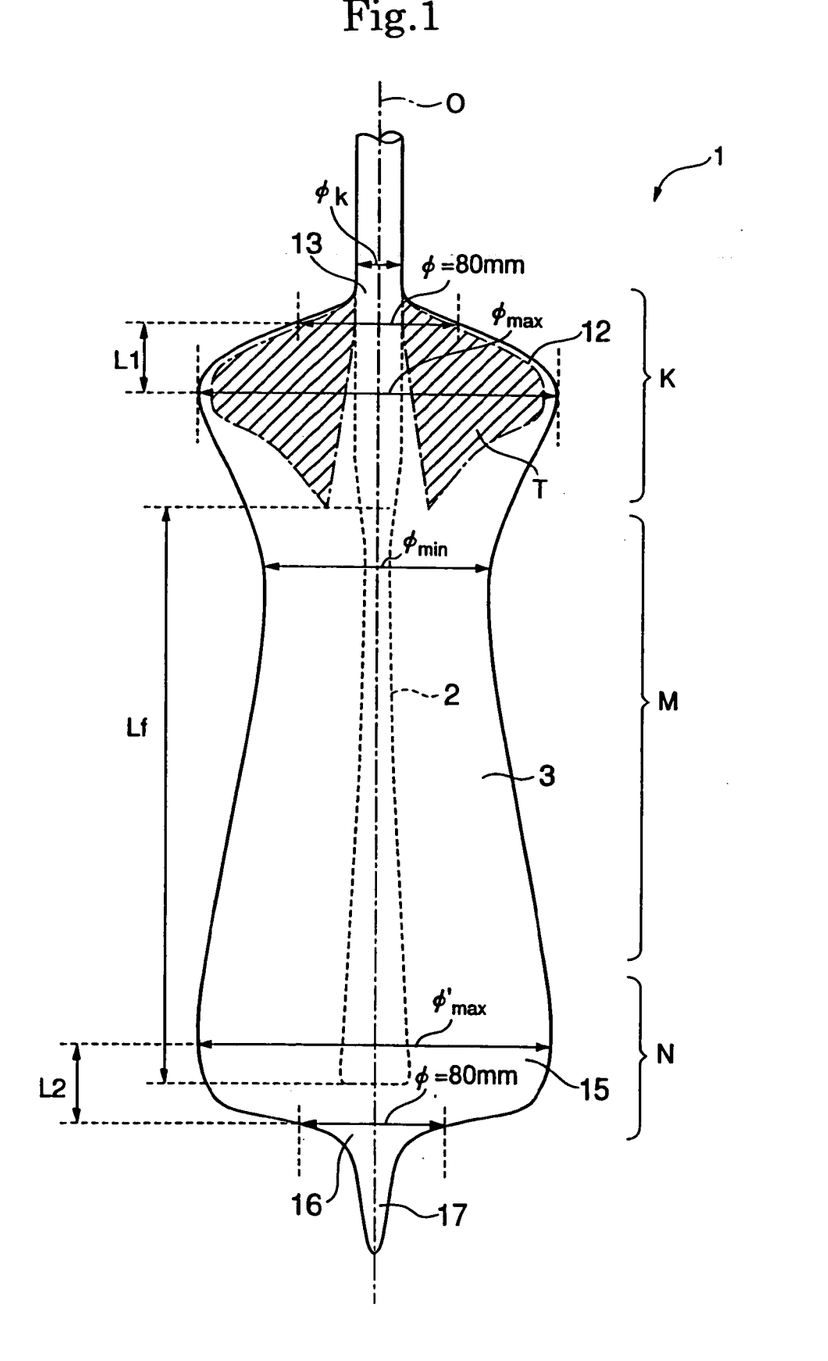
FIG. 1 is a schematic diagram showing an optical fiber preform according to an embodiment of the present invention.

FIG. 1 schematically shows an optical fiber preform according to an embodiment of this invention. The optical fiber preform 1 has a core preform 2 and a cladding layer 3 formed in the outer periphery of the core preform 2 and constituting the cladding of an optical fiber. In this embodiment, the core preform 2 does not constitute the core of the optical fiber in its entirety but constitutes a part of the core or the cladding thereof.

The optical fiber preform 1 of this embodiment is a large optical fiber preform having an outer diameter of 100 mm or more. By drawing the optical fiber preform 1 with the drawing apparatus 5 as shown in FIG. 7, the optical fiber 6 can be produced. The optical fiber preform 1 of this embodiment goes against the common knowledge that it is desirable for the outer diameter of an optical fiber preform to be uniform from one end to the other.

The optical fiber preform 1 of this embodiment has in its base end region K, which is on the upper side when the optical fiber preform 1 is suspended in order to produce the optical fiber 6 by drawing. As a result, a shoulder portion 12 thrusts beyond the middle portion M. The outer diameter of the optical fiber preform 1 decreases as it extends from this shoulder portion 12 toward the base end portion 13. The outer diameter $\phi_k$ of the base end portion 13 is substantially the same as the diameter of the core preform 2, and varies in accordance with the diameter of the core preform 2. The diameter of the core preform 2 is appropriately determined according to the diameter of the portion of the core preform 2 constituting the optical fiber core, and there is no limitation in its value. For example, it is in a range of approximately 30 to 40 mm. The diameter $d_1$ of the portion of the core preform 2 constituting the optical fiber core is determined such that the ratio of the diameter $d_2$ of the cladding layer 3 to the diameter $d_1$ ($d_2/d_1$) corresponds to an appropriate cladding-diameter/core-diameter ($=\eta$) of the optical fiber. Further, in this embodiment, the shoulder portion 12 is a portion which does not form the optical fiber, so that the ratio of the diameter $d_2$ of the cladding layer 3 to the diameter $d_1$ of the portion of the core preform 2 constituting the optical fiber core may be deviated from an appropriate cladding-diameter/core-diameter $\eta$ of the optical fiber.

In this embodiment, the length L1 from the position of the shoulder portion 12 of the maximum outer diameter $\phi$max to the base end portion where the outer diameter $\phi$ is 80 mm is not less than 80 mm and not more than 200 mm.

Further, in this embodiment, most of the cladding layer 3 in the base end region K of the optical fiber preform 1 is a non-sintered portion T (See the shaded portion in FIG. 1). In particular, in the region from the shoulder portion 12 to the base end portion 13, most of the cladding layer 3 consists of the non-sintered portion T. That is, while the surface portion and the portion around the core preform 2 have been vitrified and are transparent, the inner portion corresponding to the cladding layer 3 is the non-sintered portion T, which is clouded and opaque. The thickness of the maximum diameter portion of the non-sintered portion T of the cladding layer 3 in the shoulder portion 12 is 1.1 times the diameter of the core preform 2 or more.

In this embodiment, the tip end region N which is at the lower end when drawing has a large diameter portion 15 having an outer diameter larger than that of the middle portion M. The outer diameter of the optical fiber preform 1 is gradually diminished from the large diameter portion 15 toward the tip end portion 16, and the outer diameter of the tip end portion 16 is less than 80 mm. In this example, the length L2 from the position of the maximum diameter $\phi$max' of the large diameter portion 15 to the position on the tip end side of the outer diameter of 80 mm is not less than 50 mm and not more than 300 mm. In this embodiment, there is formed on the tip end portion 16 a small-diameter protrusion 17 which allows pulling-down to be smoothly effected when starting to draw.

In this embodiment, the maximum diameter $\phi$max of the shoulder portion 12 on the base end side is substantially equal to the maximum diameter $\phi$max' of the large diameter portion 15 on the tip end side. From the viewpoint of operability in the drawing process, it is desirable that the length L1 from the portion of the maximum diameter $\phi$max of the shoulder portion 12 on the base end side to the position of the outer diameter of 80 mm on the base end side be smaller than the length L2 from the portion of the maximum diameter $\phi$max' of the large diameter portion 15 on the tip end side to the position of the outer diameter of 80 mm on the tip end side.

Further, in this embodiment, the portion of the minimum outer diameter $\phi$min of the optical fiber preform 1 is provided on the base end side with respect to the middle position between the tip end and the base end. Further, in this embodiment, assuming that the minimum outer diameter is $\phi$min and that the maximum outer diameter is $\phi$max, the value obtained by the formula: (($\phi$max−$\phi$min/$\phi$max)×100 (%) is defined as the outer diameter difference ratio. In the optical fiber preform 1 of this embodiment, the outer diameter difference ratio is not less than 5% and not more than 25%.

The optical fiber preform 1 of this embodiment is constructed as described above. Next, an example of the process for producing this optical fiber preform 1 will be briefly described. For example, the core preform 2 is first prepared. There are various methods of preparing the core preform 2, and any one of them may be adopted in this case. The VAD method is one example.

After the preparation of the core preform 2, the core preform 2 is heated to be vitrified. Then, as needed, elongating is performed on the core preform 2 to unify its outer diameter. Thereafter, the cladding layer 3 is formed on the outer periphery of the core preform 2 to prepare a soot body.

Examples of the method of forming the cladding layer 3 include the OVD method and the JVD method.

Figure 2A:
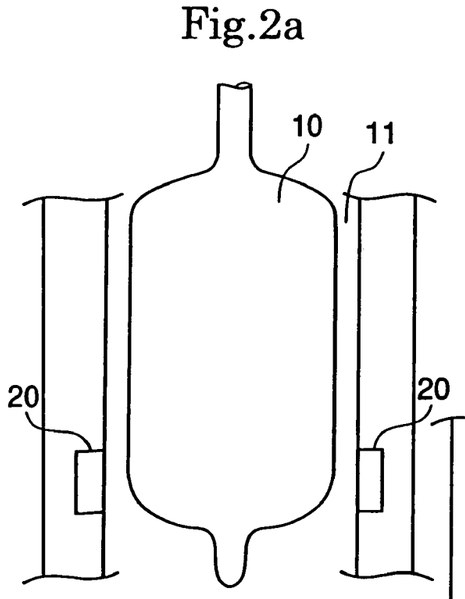
FIG. 2A is a diagram illustrating an optical fiber preform producing process according to an embodiment of the present invention.

Thereafter, the soot body is heated to perform thereon a sintering process to vitrify the same. As shown in FIG. 2A, in the sintering process, the soot body 10 is suspended with the base end portion being on the upper side, and the soot body 10 is arranged inside a sintering furnace 11. Then, the soot body 10 is moved downwardly and relatively with respect to the sintering furnace 11, and heated sequentially from the lower end toward the upper end thereof by a heating means 20.

Figure 2B:
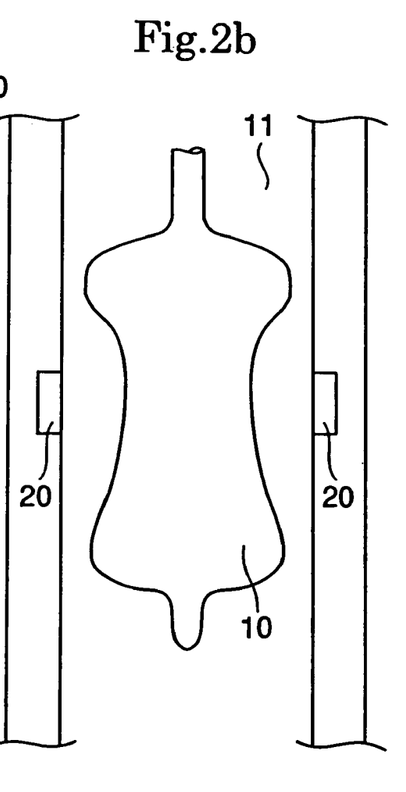
FIG. 2B is a diagram illustrating an optical fiber preform producing process subsequent to that of FIG. 2A.

As shown in FIG. 2A, when the lower portion (the tip end region N) of the soot body 10 is being heated (that is, when the heating is in the early stage), only the tip end region N attains a sintering temperature and is sintered. However, when, as shown in FIG. 2B, the middle portion (middle portion M) of the soot body 10 is being heated, the temperature of the entire soot body 10 has been raised, and the entire middle portion M of the soot body 10 attains a temperature at which it is softened. As a result, the middle portion M of the soot body 10 is softened, and, due to the weight of the lower, tip end region N, the middle portion M of the soot body 10 is elongated, with the result that the outer diameter of the middle portion M becomes smaller than that of the other portions.

Figure 2C:
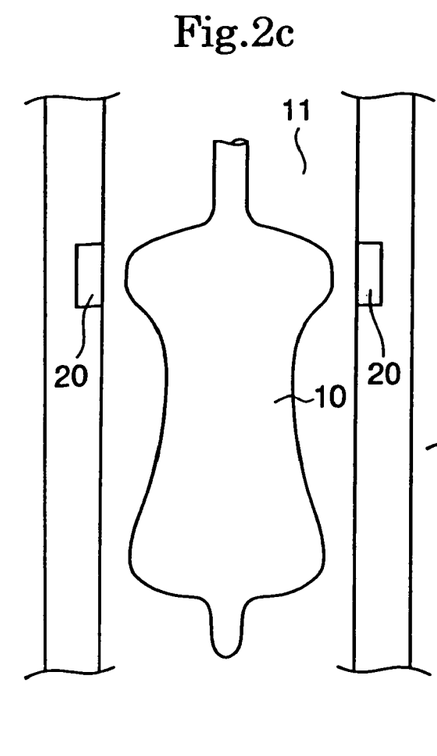
FIG. 2C is a diagram illustrating an optical fiber preform producing process subsequent to that of FIG. 2B.

When, as shown in FIG. 2C, the upper portion (base end region K) of the soot body 10 is heated, the heating temperature of the heating means 20 is made somewhat lower than the sintering temperature. As a result, in the base end region K of the soot body 10, while the surface portion thereof is sintered and vitrified, the inner portion thereof remains non-sintered. The heat conductivity of the core preform 2 is higher than that of the porous, cladding layer 3 on the outer side thereof. Thus, the high-temperature sintering heat when the middle portion, etc. of the soot body 10 is being heated is transmitted from the middle portion M of the soot body 10 to the base end region K. As a result, even if the heating temperature is lowered when heating the base end region K, the portion of the cladding body 3 around the core preform 2 in the base end region K is vitrified and becomes transparent.

As described above, by adopting a heating condition such that a non-sintered portion remains inside the base end region K of the soot body 10, softening of the base end region K of the soot body 10 is avoided. With this arrangement, the base end region K of the soot body 10 is in no danger of being torn off due to the weight of the tip end region N and the middle portion M to cause the tip end region N and the middle portion M to fall.

The optical fiber preform 1 of this embodiment can be produced as described above.

According to this embodiment, the large-sized optical fiber preform 1 having an outer diameter of 100 mm or more has a shoulder portion 12 thrusting beyond the middle portion M in the base end region K which is on the upper side when the optical fiber preform is suspended in order to produce the optical fiber 6 by drawing. As described above, the optical fiber preform 1 with such a shape can be easily produced solely by appropriately setting the heating condition, etc. for the step of sintering the soot body 10.

That is, it is possible to obtain the target optical fiber preform 1 upon completion of the step of sintering the soot body 10, and there is no need to provide a step of elongating the optical fiber preform 1 after the sintering step as in the prior art. Thus, the production process is simplified, and there is no need to provide a large-sized elongating apparatus. Further, there is no need for the heating energy required when elongating the large-sized optical fiber preform 1, thereby providing energy savings. As a result, it is possible to reduce the production cost of the optical fiber preform 1.

Further, when drawing the optical fiber preform 1, a gas is caused to flow through the interior of the drawing furnace 7 of the drawing apparatus 5 along the longitudinal direction of the optical fiber preform 1. As shown in FIG. 7, in the prior-art technique, turbulence in the gas flow occurs when the drawing is performed on the base end portion of the optical fiber preform 1 since the resistance on the upper side is then reduced. Due to this turbulence in the gas flow, the condition in the drawing furnace 7 becomes unstable, so that it is impossible to produce the optical fiber 6 by drawing in a stable manner. When it becomes thus impossible to produce the optical fiber 6 by drawing in a stable manner, there is nothing for it but to terminate the drawing, which leads to a rather short effective drawing region Lf that allows production of the optical fiber 6 by drawing from the optical fiber preform 1.

Figure 3:
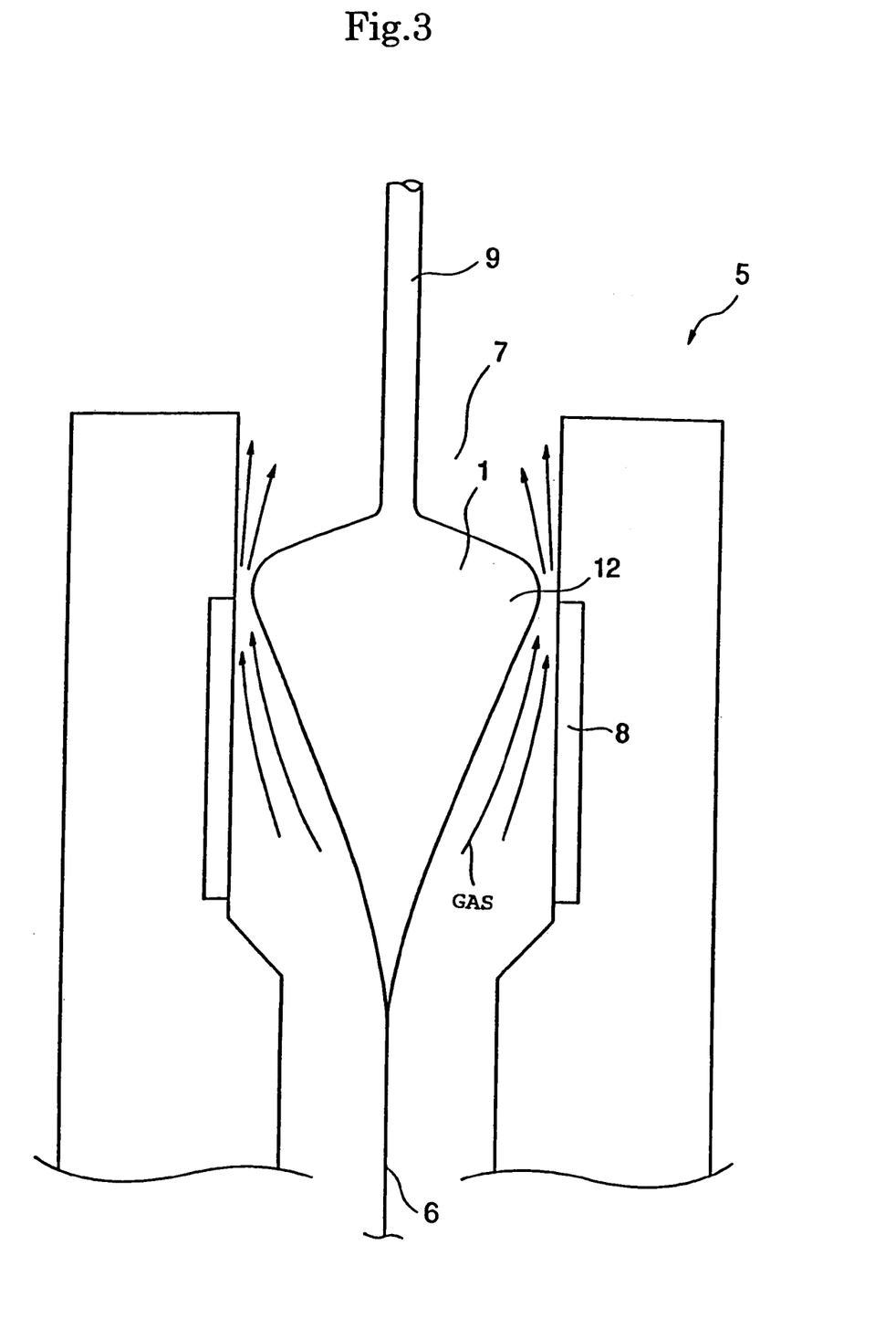
FIG. 3 is a diagram illustrating a gas flow regulating effect obtained with an optical fiber preform according to an embodiment in a furnace of a drawing apparatus.

In contrast, in this embodiment, the optical fiber preform 1 has the shoulder portion 12 in the base end region K thereof, so that, as shown in FIG. 3, the gap between the shoulder portion 12 and the inner wall surface of the drawing furnace 7 becomes smaller. Due to this small gap, the gas flow in the drawing furnace 7 is regulated. Thus, even when the drawing operation comes to be performed on the base end portion of the optical fiber preform 1, it is possible to restrain turbulence in the gas flow. This makes it possible to eliminate the problem of unstableness in drawing the optical fiber 6 due to gas flow turbulence. As a result, it is possible to increase the effective drawing region Lf of the optical fiber preform 1. Since the effective drawing region Lf of the optical fiber preform 1 can thus be increased, it is possible to increase the production length of the optical fiber 6 obtained from a single optical fiber preform 1. Thus, it is possible to achieve a reduction in the production cost of the optical fiber 6, whereby a reduction in the cost of the optical fiber 6 is facilitated.

Further, in this embodiment, the length L1 from the maximum outer diameter $\phi$max portion in the base end region K to the base end portion with the outer diameter of 80 mm of the optical fiber preform 1 is not less than 80 mm and not more than 200 mm. If the length L1 is less than 80 mm and the region between the shoulder portion 12 and the base end portion 13 is small, the stress due to the weight of the middle portion M and the tip end region N is concentrated on this small region during the step of sintering the soot body 10. As a result, there is the danger of the base end region K being worn out to cause the soot body 10 to fall. In contrast, in this embodiment, the length L1 is not less than 80 mm, so that the concentration of the stress on the base end region K of the soot body 10 during the sintering step is mitigated, thereby making it possible to prevent the soot body 10 from falling.

When the length L2 from the maximum outer diameter $\phi$max' portion of the large diameter portion 15 on the tip end side to the tip end portion with the outer diameter of 80 mm is large, the effective drawing region Lf is reduced, so that it is desirable for the length L2 to be small. However, when the length L2 is as small as less than 50 mm, the cladding layer 3 is likely to be separated from the core preform 2 during the step of sintering the soot body 10 and cracks will be generated in the cladding layer 3. In this embodiment, the length L2 is not less than 50 mm and not more than 300 mm, so that it is possible to eliminate such problems.

In this way, the construction of this embodiment provides superior effects as mentioned above.

Figure 4:
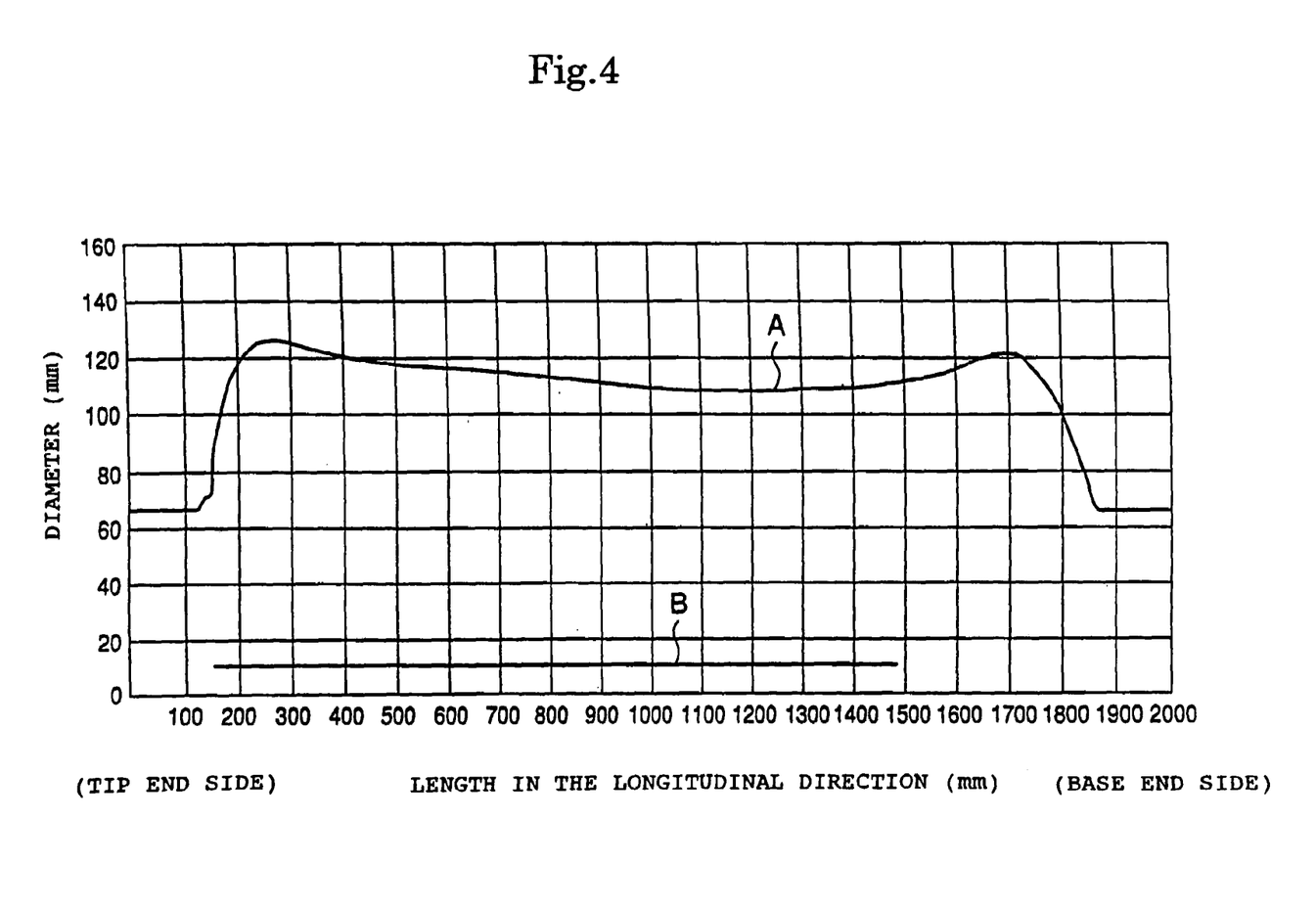
FIG. 4 is a graph illustrating a first specific example of an optical fiber preform.
Figure 5:
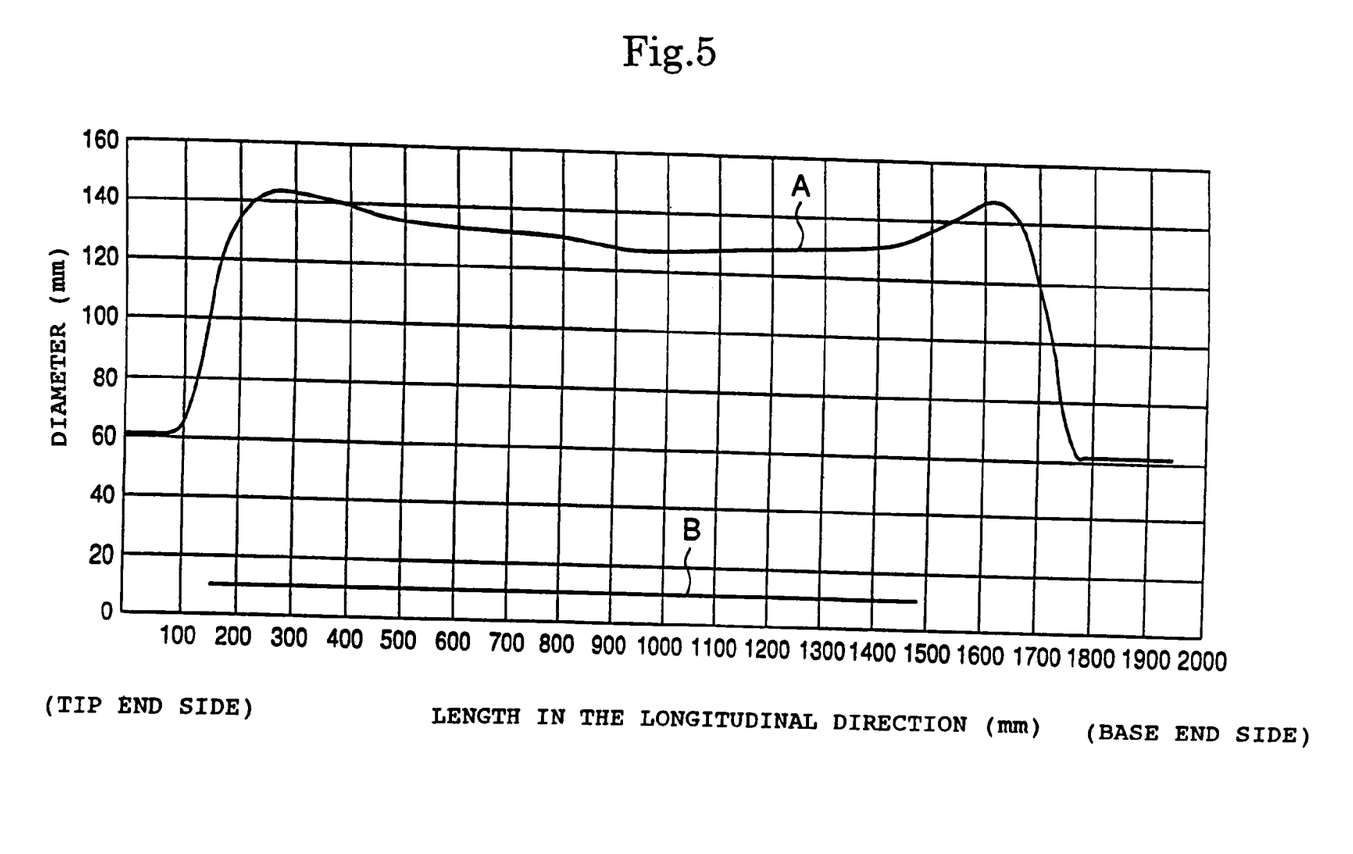
FIG. 5 is a graph illustrating a second specific example of an optical fiber preform.

The present inventor has produced a plurality of types of optical fiber preform 1 having the construction of this embodiment to confirm its effects. FIG. 4 is a graph showing the configuration of a first specific example of the optical fiber 1. FIG. 5 is a graph showing the configuration of a second specific example of the optical fiber 1. In FIGS. 4 and 5, the solid line A indicates the outer diameter of the optical fiber preform, and the solid line B indicates the portion constituting the core of the optical fiber. Further, the horizontal axis indicates the longitudinal length of the optical fiber preform 1 as measured from the tip end thereof, and the vertical axis indicates the diameter thereof.

It is to be estimated through calculation that the optical fiber preform 1 of the first specific example (See FIG. 4) allows production of an optical fiber 6 having a length of approximately 1065 km. Its average outer diameter is approximately 114 mm, the maximum outer diameter ϕmax of the shoulder portion 12 is approximately 122 mm, and the maximum outer diameter ϕmax' of the large diameter portion 15 is approximately 126 mm. Further, the minimum outer diameter ϕmin is approximately 108 mm, and the outer diameter difference ratio is approximately 14.2%. The position of the minimum outer diameter portion is a position spaced apart by approximately 500 mm from the maximum outer diameter portion of the shoulder portion 12 toward the tip end. In other words, this position of the minimum outer diameter portion is a position spaced apart by approximately 950 mm from the maximum outer diameter portion of the large diameter portion toward the base end, and is nearer to the base end than the middle position between the base end and the tip end.

Further, the length L1 from the maximum outer diameter portion of the shoulder portion 12 to the base end portion with the outer diameter of ϕ80 mm is 140 mm. The length L2 from the maximum outer diameter portion of the large diameter portion 15 to the tip end portion with the outer diameter of ϕ80 mm is 100 mm. Furthermore, in the base end region K, the non-sintered portion T of the maximum outer diameter portion of the shoulder portion 12 also has the maximum diameter, which is approximately 100 mm.

It is to be estimated through calculation that the optical fiber preform 1 of the second specific example (See FIG. 5) allows production of an optical fiber 6 having a length of approximately 1453 km. Its average outer diameter is approximately 132 mm, the maximum outer diameter ϕmax of the shoulder portion 12 is approximately 146.5 mm, and the maximum outer diameter ϕmax' of the large diameter portion 15 is approximately 143.4 mm. Further, the minimum outer diameter ϕmin is approximately 126.5 mm, and the outer diameter difference ratio is approximately 13.7%.

Also, the length L1 from the maximum outer diameter portion of the shoulder portion 12 to the base end portion with the outer diameter of ϕ80 mm is 125 mm. The length L2 from the maximum outer diameter portion of the large diameter portion 15 to the tip end portion with the outer diameter of ϕ80 mm is 123 mm. Furthermore, in the base end region K, the non-sintered portion T of the maximum outer diameter portion is approximately 100 mm.

Each of the optical fiber preforms 1 of the first and second specific examples was subjected to drawing in the drawing apparatus with the drawing furnace 7 having an inner diameter of 165 mm to produce the optical fiber 6. In this case, it was stably possible to draw an appropriate optical fiber 6 having a predetermined cladding/core ratio by a length as calculated. In this way, it was confirmed that the effects of the above-described embodiments could be obtained.

This invention is not restricted to the above embodiment but allows various modifications. For example, while in the above embodiment the maximum outer diameter of the shoulder portion 12 and the maximum outer diameter of the large diameter portion 15 are substantially equal to each other, it is of course possible for the maximum outer diameter of the shoulder portion 12 and the maximum outer diameter of the large diameter portion 15 to be different.

What is claimed is:

1. An optical fiber preform comprising:
    a core preform constituting a core of an optical fiber; and
    a cladding layer formed in the outer periphery of the core preform and constituting a cladding of the optical fiber,
    wherein the optical fiber preform, after sintering, has the cladding layer which substantially consists of a non-sintered portion in a base end region, which is on the upper side when it is suspended for a drawing process to produce an optical fiber.

2. The optical fiber preform according to claim 1, wherein the optical fiber preform is comprised of a large-sized optical fiber preform having an outer diameter of 100 nm or more.

3. The optical fiber preform according to claim 1, wherein a surface portion of the non-sintered portion is vitrified.

4. The optical fiber preform according to claim 1,
    wherein a thickness of the non-sintered portion of the cladding layer in the maximum diameter portion of the non-sintered portion is 1.1 times the diameter of the core preform or more.

* * * * *